(12) United States Patent
Whalen et al.

(10) Patent No.: US 10,383,274 B2
(45) Date of Patent: Aug. 20, 2019

(54) PADDLE CLOSING WHEEL

(71) Applicant: YETTER MANUFACTURING COMPANY, Colchester, IL (US)

(72) Inventors: Patrick T. Whalen, Colchester, IL (US); James D. Lascelles, Ipava, IL (US); Carl A. Woodside, Littleton, IL (US)

(73) Assignee: YETTER MANUFACTURING COMPANY, Colchester, IL (US)

( * ) Notice: Subject to any disclaimer, the term of this patent is extended or adjusted under 35 U.S.C. 154(b) by 0 days.

(21) Appl. No.: 15/617,920

(22) Filed: Jun. 8, 2017

(65) Prior Publication Data

US 2017/0273234 A1 Sep. 28, 2017

Related U.S. Application Data

(62) Division of application No. 13/534,563, filed on Jun. 27, 2012, now Pat. No. 9,681,599.

(60) Provisional application No. 61/501,269, filed on Jun. 27, 2011.

(51) Int. Cl.
*A01C 5/06* (2006.01)

(52) U.S. Cl.
CPC .................... *A01C 5/066* (2013.01)

(58) Field of Classification Search
CPC .. A01C 5/066; A01C 5/06; A01C 5/00; A01C 7/205; A01C 7/201; A01C 7/20; A01C 7/00
See application file for complete search history.

(56) References Cited

U.S. PATENT DOCUMENTS

| | | | |
|---|---|---|---|
| 3,186,497 A | 6/1965 | Forbes | |
| 3,202,221 A | 8/1965 | Monk et al. | |
| 3,523,585 A | 8/1970 | Godbersen | |
| 3,528,507 A | 9/1970 | Morkoski | |
| 5,398,625 A * | 3/1995 | Johnson | A01C 5/068 111/164 |
| 5,970,891 A | 10/1999 | Schlagel | |
| 6,068,061 A | 5/2000 | Smith et al. | |
| 6,152,418 A * | 11/2000 | Panicci | A47G 1/164 248/476 |

(Continued)

FOREIGN PATENT DOCUMENTS

KR 20-1984-0002642 12/1984

OTHER PUBLICATIONS

"Close-N-Till Cast Wheels," S.I. Distributing Inc., found on Internet Website: http://sidist.com/index.cfm?fuseaction-category.display &category_ID-140, accessed on Apr. 1, 2013.

(Continued)

*Primary Examiner* — Christopher J. Novosad
(74) *Attorney, Agent, or Firm* — Barnes & Thornburg LLP; Mark J. Nahnsen

(57) ABSTRACT

A pair of paddle closing wheels are adapted to be coupled to a frame structure that is coupled to a planter unit pulled by a motive power source. The paddle closing wheels are rotatably attached to the frame structure and are adapted to engage the soil. Fingers extend from the paddle closing wheel in a radial direction and include paddles that are coupled to the fingers. Once the seed is deposited in the soil the paddle closing wheels move the soil to cover up the seeds.

18 Claims, 4 Drawing Sheets

(56) References Cited

U.S. PATENT DOCUMENTS

| | | |
|---|---|---|
| 6,314,897 B1 | 11/2001 | Hagny |
| 6,854,525 B2 | 2/2005 | Martindale |
| 6,907,833 B2 | 6/2005 | Thompson et al. |
| 7,757,777 B1 | 7/2010 | Wipf et al. |
| 7,806,197 B2 | 10/2010 | Steinlage et al. |
| 8,333,161 B2 | 12/2012 | Arnett et al. |
| 9,351,438 B2* | 5/2016 | Whalen ................. A01C 5/068 |
| 9,681,597 B1* | 6/2017 | Henshaw ................. A01B 1/16 |
| 2009/0065222 A1* | 3/2009 | Steinlage ............. A01B 33/021 172/184 |
| 2010/0275827 A1 | 11/2010 | Van Buskirk et al. |
| 2011/0247843 A1 | 10/2011 | Whalen et al. |

OTHER PUBLICATIONS

U.S. Appl. No. 13/534,563, filed Jun. 27, 2012.

\* cited by examiner

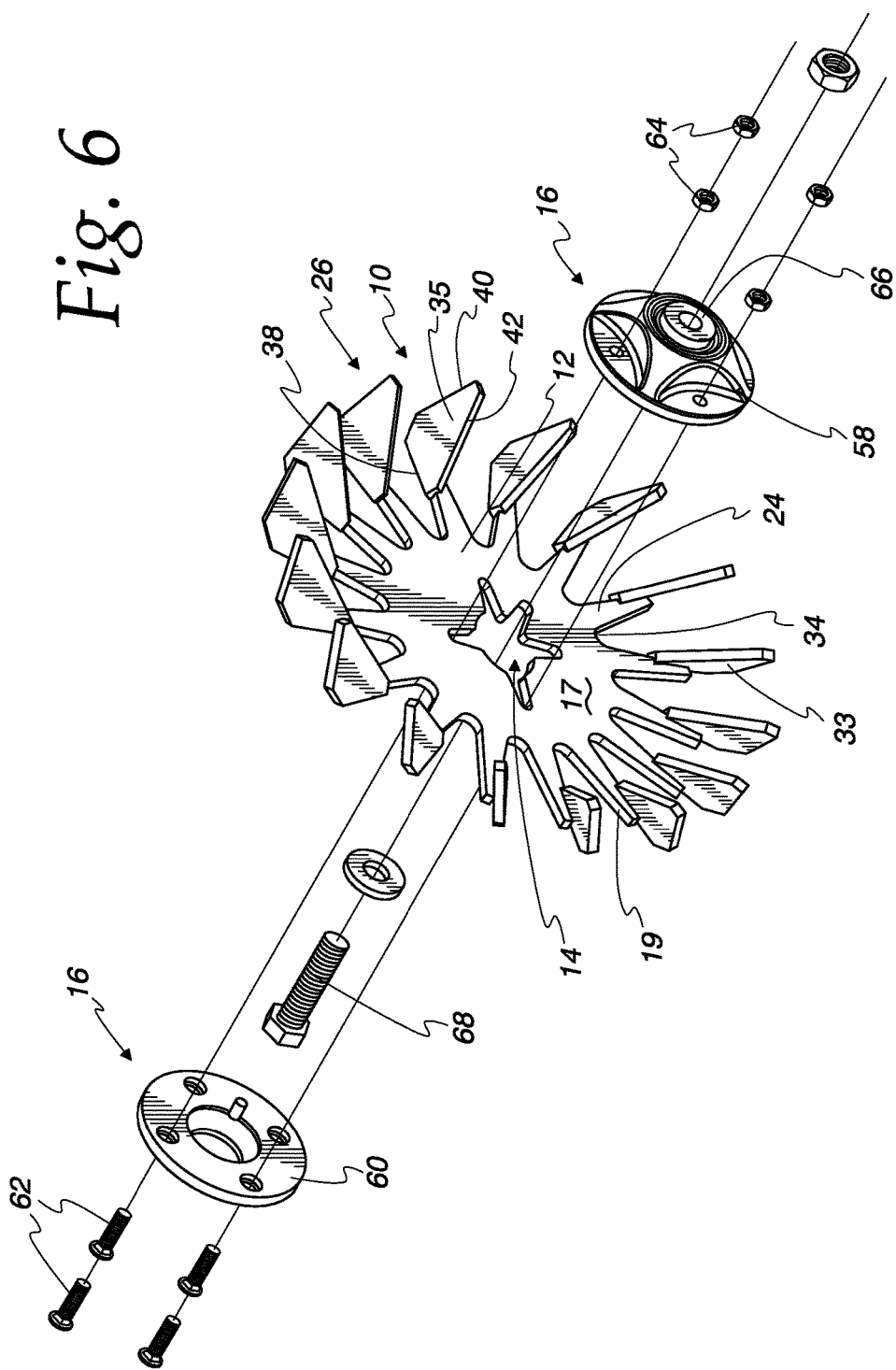

PADDLE CLOSING WHEEL

CROSS-REFERENCE TO RELATED PATENT APPLICATIONS

This application is a Divisional application of co-pending U.S. patent application Ser. No. 13/534,563, filed Jun. 27, 2012, which claims priority to U.S. Provisional Application Ser. No. 61/501,269, filed Jun. 27, 2011. The above-referenced disclosures are incorporated herein by reference in their entireties.

BACKGROUND

The present disclosure relates to the field of agricultural implements drawn by motive power sources such as tractors and is used for planting. More particularly, the present disclosure relates to closing wheels used for closing seed trenches in a manner to promote uniform germination and emergence. In damp soil conditions, conventional closing wheels commonly found on seeding equipment can compact the soil used to close the seed trench. This can result in undesirable effects.

Excessive soil compaction impedes root growth and therefore limits the amount of soil explored by roots. This, in turn, can decrease the plant's ability to take up nutrients and water. From the standpoint of crop production, the adverse effect of soil compaction on water flow and storage may be more serious than the direct effect of soil compaction on root growth.

In dry years, soil compaction can lead to stunted, drought stressed plants due to decreased root growth. Without timely rains and well-placed fertilizers, yield reductions will occur. Soil compaction in wet years decreases soil aeration. This results in increased denitrification (loss of nitrate-nitrogen to the atmosphere). There can also be a soil compaction induced nitrogen and potassium deficiency. Plants need to spend energy to take up potassium. Reduced soil aeration affects root metabolism. There can also be increased risk of crop disease. All of these factors result in added stress to the crop and, ultimately, yield loss.

SUMMARY

In accordance with the present disclosure, closing wheels are provided to be drawn by a motive power source such as a tractor and used close seed trenches to prevent the seed trench from reopening and provide the proper soil conditioning to promote uniform germination and emergence.

In illustrative embodiments, the closing wheels include a generally planar body portion provided with a series of radially extending fingers about its periphery. The closing wheels also include series of paddles attached to the fingers of the closing wheel, which are used to churn the soil into a finer texture. The finer soil particles better close the seed trench and prevent air pockets in the seed trench. Air pockets in the seed trench negatively effect germination which reduces the yield potential of the emerging crop. Also, the need to run drag chains to help close the trench is reduced. The closing wheels minimize soil compaction to reduce crop issues.

Closure wheels of the present disclosure leave a soft mulch on top of the seedbed to prevent crusting and baking. There is no smearing and extreme compaction found as when using rubber closing wheels. The closing wheels of the present disclosure effectively firm the soil around the seed, creating excellent seed-to-soil contact. Good soil contact with the seed is one of the most important aspects of obtaining uniform emergence.

Additional features of the disclosure will become apparent to those skilled in the art upon consideration of the following detailed description of illustrative embodiments exemplifying the best mode of carrying out the disclosure as presently perceived.

BRIEF DESCRIPTION OF THE DRAWINGS

The detailed description particularly refers to the accompanying figures in which:

FIG. 6 is an exploded perspective view showing a hub assembly and how it is to be coupled to a paddle closing wheel.

DETAILED DESCRIPTION

Figure 1:
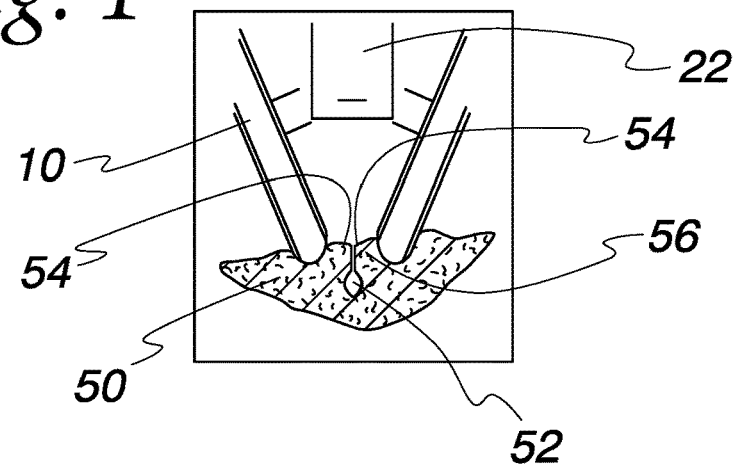
FIG. 1 is an illustration of a furrow that was not properly closed over a seed, creating poor seed to soil contact.

In illustrative embodiments, a paddle closing wheel 10 includes a body portion 12 that is provided with a central opening 14 for connection to a hub assembly 16. The central opening 14 includes a series of radially extending slots 18-20 that allow for the use of fasteners 62, 64 when coupling the paddle closing wheel 10 to the hub assembly 16. The paddle closing wheel 10 and hub assembly 16 are configured to be coupled to a frame structure 22 that is coupled to the planter unit (agricultural planter). Frame structure 22 can be adjusted with respect to the planter to adjust the position of the paddle closing wheels 10 with respect to the ground. A pair of paddle closing wheels 10 are rotatably attached to the frame structure 22 and are arranged in a positive camber orientation such that the lower ends of the paddle closing wheels 10 are closer together than the upper ends to form generally a V-shape configuration.

Figure 2:
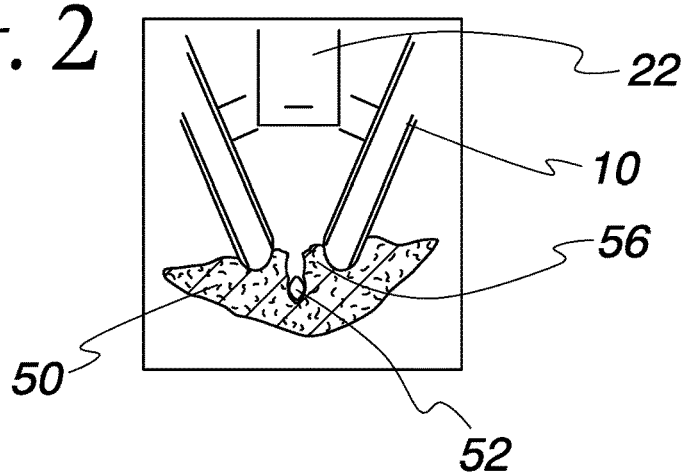
FIG. 2 is an illustration of a furrow that cracked open to expose a seed, which dries out and does not germinate.
Figure 3:
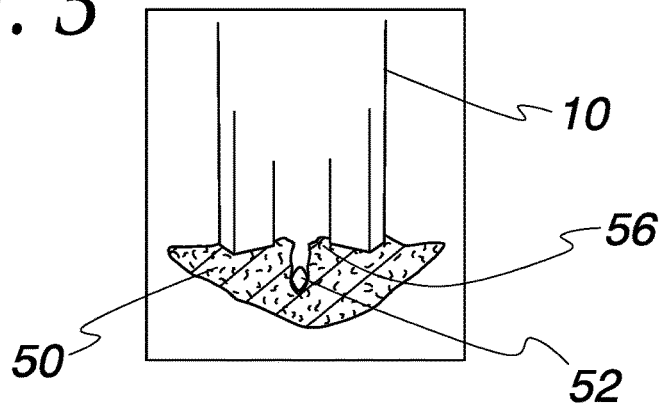
FIG. 3 is an illustration of a furrow with a gap above the seed, which causes the seed to leaf out, preventing the plant from penetrating the soil.
Figure 4:
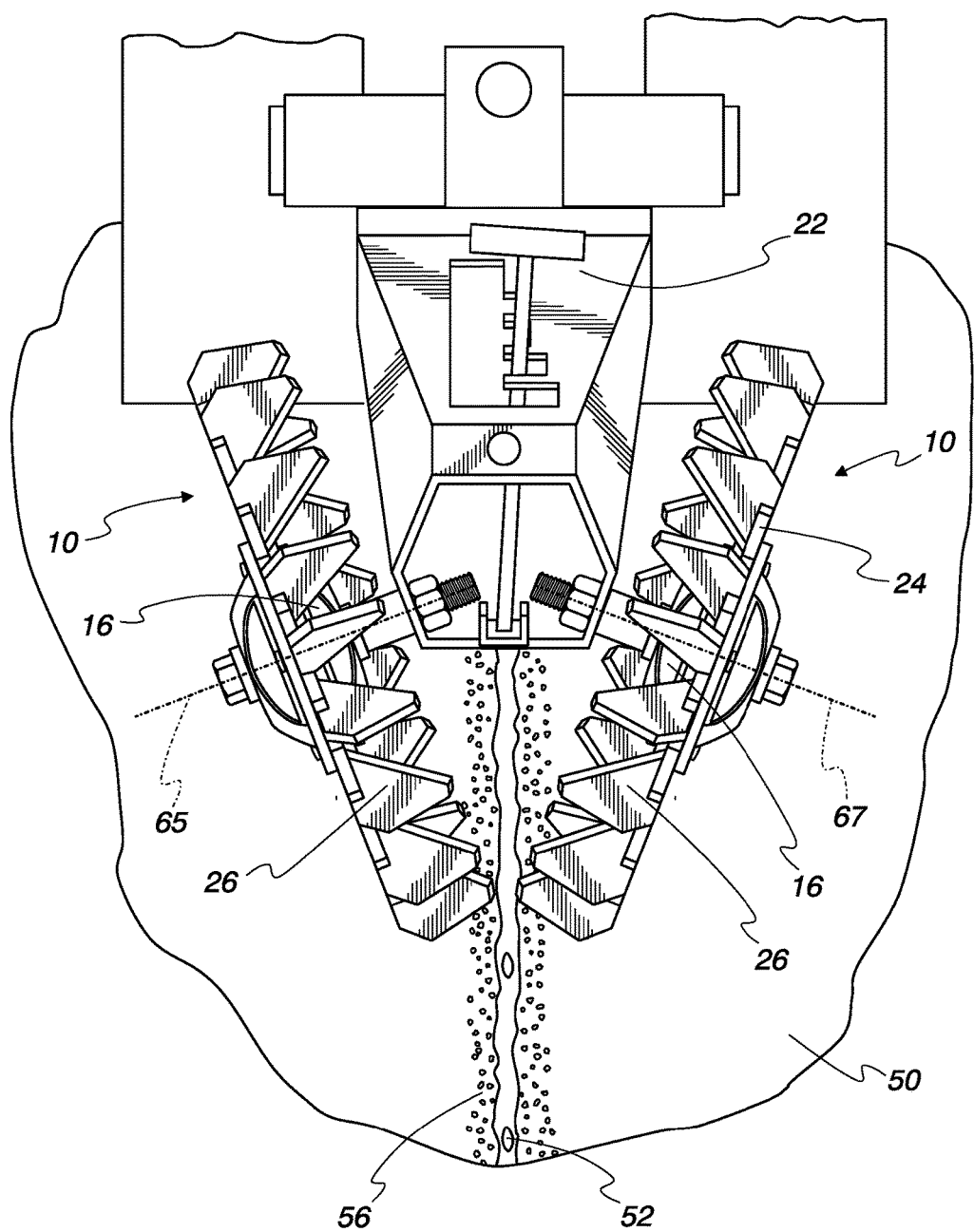
FIG. 4 is a perspective view of a pair of paddle closure wheels rotatably mounted to an adjustable frame structure of a planting unit, showing the paddle closure wheels mounted at an angle to the vertical and having positive camber.

Good soil 50 contact with the seed 52 is one of the most important aspects of obtaining uniform emergence. If the sides 54 of the furrow 56 do not close in over the seed 52, there is poor seed 52 to soil contact as shown in FIG. 1. If the furrow 56 cracks open and exposes the seed 52, the seed 52 dries out and does not germinate as shown in FIG. 2. If the furrow 56 closes at the top without soil directly above the seed 52, the seed 52 may germinate, leaf out & then be unable to penetrate the crust as shown in FIG. 3. The present disclosure causes the reduction or elimination of air pockets and promotes higher yields by creating an ideal seedbed condition in unfavorable soil/planting conditions The hub assembly 16 attaches to the center of the paddle closing wheel 10 and permits the paddle closing wheel 10 to rotate. Hub assembly 16 includes an inner hub 58 and an outer hub 60 that is configured to be secured to inner hub 58. Inner hub 58 is positioned on a first side 17 of paddle closing wheel 10 and outer hub 60 is positioned on the second side 19 of the paddle closing wheel 10 and secured with bolts 62 and nuts 64. Inner hub 60 includes bearing 66 to permit paddle closing wheel 10 to rotate about bolt 68.

The paddle closing wheel 10 also includes fingers 24 that radially extend from the body portion 12 of the paddle closing wheel 10 about its periphery. Fingers 24 each include a paddle 26. Paddles 26 engage the soil to assist in closing the seat trench in the soil. While it is preferred to include a paddle 26 on each finger 24, it is contemplated that fewer paddles could be used to accomplish the trench closure. Between each finger 24 is a curved recessed area 28 that is configured to reduce soil buildup between the fingers 24 during operation. Fingers 24 are equally spaced around the periphery of the wheel 10 so the paddles 26 can make contact with the soil in a constant manner Paddles 26 are mounted to the edge 30 or 32 of the fingers 24 at an angle to the direction of travel of the planter. The angled paddles 26 churn the soil to break up dirt clods and push soil towards the seed trench.

Figure 5:
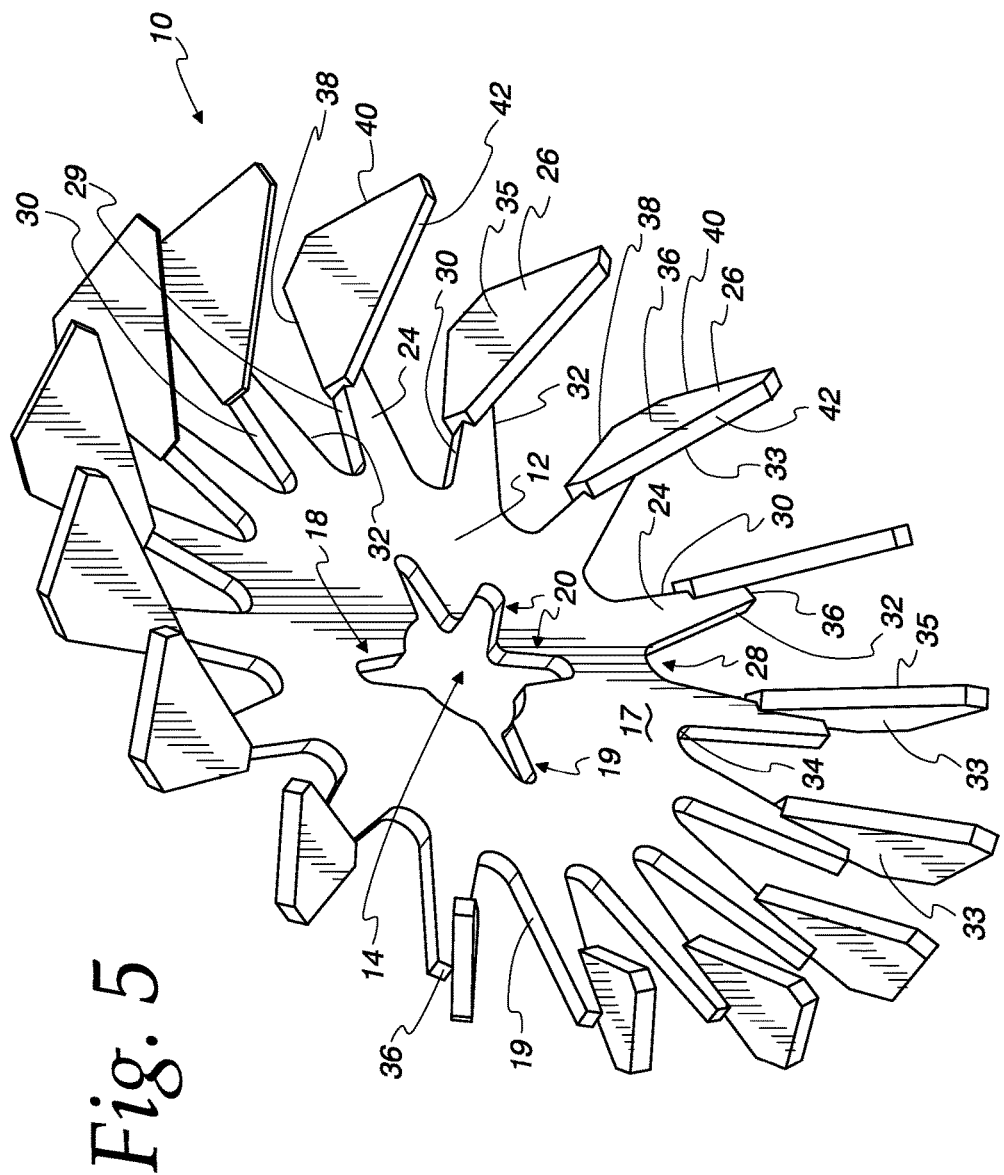
FIG. 5 is a perspective view of a paddle closing wheel showing the body portion, a series of radially extending fingers disposed about the perimeter of the body portion and a series of paddles coupled to the fingers.

Fingers 24 extend from paddle closing wheel 10 in a radially outward direction and include a first edge 30 and a spaced apart second edge 32. First edge 30 and second edge 32 are interconnected by recessed area 28, which includes curved edge 34. Fingers 24 also include a crown 36 that is positioned at the end of each finger 24 and interconnects first edge 30 with second edge 32, as shown in FIG. 5.

Paddles 26 of paddle closing wheels 10 are preferably triangular in shape and include a first face 33 and a second face 35. While triangular paddles 26 are preferred, it is contemplated that square or rectangular paddles could be used. The paddles 26 also include a first edge 38, a second edge 40 that is generally perpendicular to the first edge 38 and a third edge 42 that generally forms a hypotenuse between the first and second sides 38, 40. Paddles 26 are coupled to fingers 24 on first face 33 along first edge 38 of paddles 26. Paddles 26 can be cast with fingers 24, or welded into position. The paddles 26 are attached to the fingers 24 at a 40 degree angle to the direction of travel.

The paddle closing wheels 10 can be fabricated from metal stock, poured as a casting or laser cut with paddles 26 formed on the end of each finger 24. Paddles 26 are set to run at a slight angle to the direction of travel of the wheel 10. The paddles 26 chop and churn the soil without soil buildup between the fingers 24 holding the paddles 26. The angle of attack of the paddles 26 moves soil towards the seed trench to thoroughly cover the seed. Paddles 26 can be welded to fingers 24.

The preferred paddle closing wheels 10 have a diameter from about 14" in diameter to about 16" in diameter and preferably are 15" in diameter. The paddle closing wheels 10 preferably have from about thirteen teeth to about nineteen teeth around the periphery of the paddle closing wheels 10 and preferably include sixteen teeth. The paddles 16 have a width at an outer edge 28 from about 2" wide to about 3.6" wide and preferably 3" wide. The paddles 26 are attached to the fingers 24 at an angle from about 20 degrees to about 45 degrees to the direction of travel as observed from the leading edge of the wheels 10.

Each finger 24 is preferably equally spaced about the periphery of the paddle closing wheels 10. Each finger 24 includes recessed area 28 that is configured to reduce soil buildup between the fingers 24 during operation. Each paddle closing wheel 10 is mounted to hub assembly 16 so that paddle closing wheels 10 can be coupled to frame structure 22. In use a trench is cut into the soil and a seed is deposited. Once the seed is deposited, paddle closing wheels 10 move the soil to cover up the seed.

A soil trench closing apparatus 10 is used with an agricultural planter to engage soil 50 to close a soil trench (seed trench) during forward movement of the agricultural planter in a forward direction of travel. The soil trench closing apparatus includes frame structure 22 connectable to the agricultural planter. Closing wheels 10 are pivotally connected to the frame structure 22 and have a first side and an opposed second side. Closing wheels 10 include a plurality of fingers 24 extending from the periphery of the closing wheels 10. The fingers 24 have a first edge 30 and a second edge 32.

Paddles 26 are coupled to the fingers 24 of the closing wheel 10. The closing wheels 10 are oriented with respect to each other so that the wheels 10 converge near the soil trench. Rotation of the closing wheels 10 causes the paddles 26 to engage the soil to close the soil trench and covering the seeds. The paddles 26 are coupled to one of the first edge 30 or second edge 32 of the fingers 24. The paddles 26 are mounted on fingers 24 so that they extend outwardly from one of the first or second sides 17, 19 of the closing wheels 10. The paddles 26 include a face that forms a plane that is at an angle with respect to the first edge of the fingers 24.

Fingers 24 of closing wheels 10 are arranged such that a first edge 30 of a first finger and a second edge 32 of a second finger are interconnected by a curved edge 34. The fingers 24 also include crown 36 that is positioned at the end of each finger 24 and interconnects the first and second edges 30, 32. The paddles include a first face 61 and a second face 63. The paddles 26 include a first edge 38, a second edge 40 that is generally perpendicular to the first edge 38 and a third edge 42 that generally forms a hypotenuse between the first and second edges 38, 40. The paddles 26 are coupled to fingers 24 on first face 61 of the paddles 26. The first closing wheel 10 is coupled to the frame structure along a first axis of rotation 65 and the second closing wheel 10 is coupled to the frame structure along a second axis of rotation 67 that is not co-linear to the first axis of rotation 65.

In use, a planting apparatus for planting seeds in a field is coupled to a motive force, such as a tractor and is pulled in a forward direct. During this activity, a seed trench is cut into the soil and seeds are deposited in the trench. The frame structure 22 is adjusted so that closing wheels 10 are in contact with the soil. Closing wheels 10 are mounted to the frame structure 22 so that they have a general v-shaped configuration and are slightly toed in at the front. Forward movement of the planting apparatus causes closing wheels 10 to engage the soil displaced when the trench was opened and rotate. Rotation of the closing wheels 10 causes paddles 26 to move soil back into the trench to cover the seeds.

Various features of the invention have been particularly shown and described in connection with the illustrative embodiment of the invention, however, it must be understood that these particular arrangements may merely illustrate, and that the invention is to be given its fullest interpretation within the term of the appended claims.

What is claimed is:

1. A soil trench closing wheel for closing a trench formed in soil, the soil trench closing wheel comprising:
   a substantially planar body portion having a first side and an opposed second side;
   a plurality of fingers extending from a periphery of the body portion and substantially coplanar with the body portion, each finger of the plurality of fingers having a first edge a second edge separated by a crown positioned between and interconnecting the first and second edges, each finger of the plurality of fingers being separated by a recessed area; and a plurality of paddles coupled to and extending along one of the first edge or second edge of the plurality of fingers and are mounted so that a majority of the paddle extends outwardly from one of the first or second sides of the body portion, wherein the soil trench closing wheel is configured for rotation about an axis of rotation, each paddle of the plurality of paddles includes a face that forms a plane that is at a non-parallel angle with respect to the axis of rotation, and the plurality of paddles are attached to the plurality of fingers at an angle from about 25 degrees to about 45 degrees to a centerline of the soil trench.

2. The soil trench closing wheel of claim 1, wherein a first edge of a first finger and a second edge of a second finger are interconnected by a curved edge.

3. The soil trench closing wheel of claim 1, wherein each paddle of the plurality of paddles is triangular in shape.

4. The soil trench closing wheel of claim 3, wherein each paddle of the plurality of paddles includes a first face and a second face.

5. The soil trench closing wheel of claim 4, wherein each paddle of the plurality of paddles includes a first edge, a second edge that is generally perpendicular to the first edge and a third edge that generally forms a hypotenuse between the first and second edges of the paddle.

6. The soil trench closing wheel of claim 1, wherein the plurality of paddles are coupled to one of the first edge or second edge of the plurality of fingers.

7. The soil trench closing wheel of claim 1, wherein the plurality of paddles are mounted so that they extend outwardly from one of the first or second sides of the soil trench closing wheel.

8. The soil trench closing wheel of claim 1, wherein the plurality of fingers are made from a polymer material.

9. A soil trench closing wheel for closing a trench formed in soil, the soil trench closing wheel comprising:

a substantially planar body portion having a first side and an opposed second side;

a plurality of fingers extending from a periphery of the body portion and substantially coplanar with the body portion, each finger of the plurality of fingers having a first edge, a second edge, and a crown positioned at an end of the finger between and interconnecting the first and second edges, each finger of the plurality of fingers being separated by a recessed area; and a plurality of paddles coupled to and extending along one of the first edge or second edge of the plurality of fingers and are mounted so that a majority of the paddle extends outwardly from one of the first or second sides of the body portion, wherein the soil trench closing wheel is configured for rotation about an axis of rotation, each paddle of the plurality of paddles includes a face that forms a plane that is at a non-parallel angle with respect to the axis of rotation, and the plurality of paddles are attached to the plurality of fingers at an angle from about 25 degrees to about 45 degrees to a centerline of the soil trench.

10. The soil trench closing wheel of claim 9, wherein each paddle of the plurality of paddles is triangular in shape.

11. The soil trench closing wheel of claim 10, wherein each paddle of the plurality of paddles includes a first face and a second face.

12. The soil trench closing wheel of claim 11, wherein each paddle of the plurality of paddles includes a first edge, a second edge that is generally perpendicular to the first edge and a third edge that generally forms a hypotenuse between the first and second edges of the paddle.

13. The soil trench closing wheel of claim 9, wherein the plurality of paddles are coupled to one of the first edge or second edge of the plurality of fingers.

14. The soil trench closing wheel of claim 9, wherein the plurality of paddles are mounted so that they extend outwardly from one of the first or second sides of the soil trench closing wheel.

15. A soil trench closing wheel for closing a trench formed in soil, the soil trench closing wheel comprising:

a substantially planar body portion having a first side and an opposed second side;

a plurality of fingers extending from a periphery of the body portion and substantially coplanar with the body portion, each finger of the plurality of fingers having a first edge a second edge separated by a crown positioned between and interconnecting the first and second edges, each finger of the plurality of fingers being separated by a recessed area; and a plurality of paddles coupled to and extending along one of the first edge or second edge of the plurality of fingers and are mounted so that a majority of the paddle extends outwardly from one of the first or second sides of the body portion, wherein the soil trench closing wheel is configured for rotation about an axis of rotation, each paddle of the plurality of paddles includes a face that forms a plane that is at a non-parallel angle with respect to the axis of rotation.

16. The soil trench closing wheel of claim 15, wherein a first edge of a first finger and a second edge of a second finger are interconnected by a curved edge.

17. The soil trench closing wheel of claim 15, wherein each paddle of the plurality of paddles is triangular in shape.

18. The soil trench closing wheel of claim 17, wherein each paddle of the plurality of paddles include a first edge, a second edge that is generally perpendicular to the first edge and a third edge that generally forms a hypotenuse between the first and second edges of the paddle.

\* \* \* \* \*